(12) United States Patent
Hsieh et al.

(10) Patent No.: US 7,599,946 B2
(45) Date of Patent: Oct. 6, 2009

(54) SYSTEMS AND METHODS FOR DISCOVERING FREQUENTLY ACCESSED SUBTREES

(75) Inventors: Cheng-Enn Hsieh, Taoyuan County (TW); Arbee Chen, Taipei (TW)

(73) Assignee: Qisda Corporation, Taoyuan County (TW)

( * ) Notice: Subject to any disclaimer, the term of this patent is extended or adjusted under 35 U.S.C. 154(b) by 252 days.

(21) Appl. No.: 11/604,743

(22) Filed: Nov. 28, 2006

(65) Prior Publication Data

US 2007/0244887 A1 Oct. 18, 2007

(51) Int. Cl.
*G06F 7/00* (2006.01)
(52) U.S. Cl. ....................... 707/100; 707/101
(58) Field of Classification Search ............... 707/1–6, 707/100, 101
See application file for complete search history.

(56) References Cited

U.S. PATENT DOCUMENTS

2005/0243740 A1* 11/2005 Chen et al. .................. 707/101
2008/0155120 A1* 6/2008 Argawal et al. ............. 709/242

* cited by examiner

*Primary Examiner*—Wilson Lee

(57) ABSTRACT

A method for discovering frequently accessed subtrees, performed by an electronic apparatus, comprises the following steps. A request is received from a source. A global prefix tree (GPT) comprising multiple traversal paths is acquired, each traversal path representing one of a plurality of frequently accessed subtrees. A response comprising the GPT is transmitted to the source, thereby enabling the source to discover the frequently accessed subtrees based on the GPT. The GPT is generated in response to multiple data streams respectively comprising accessed nodes of a partially traversed theoretical tree.

14 Claims, 16 Drawing Sheets

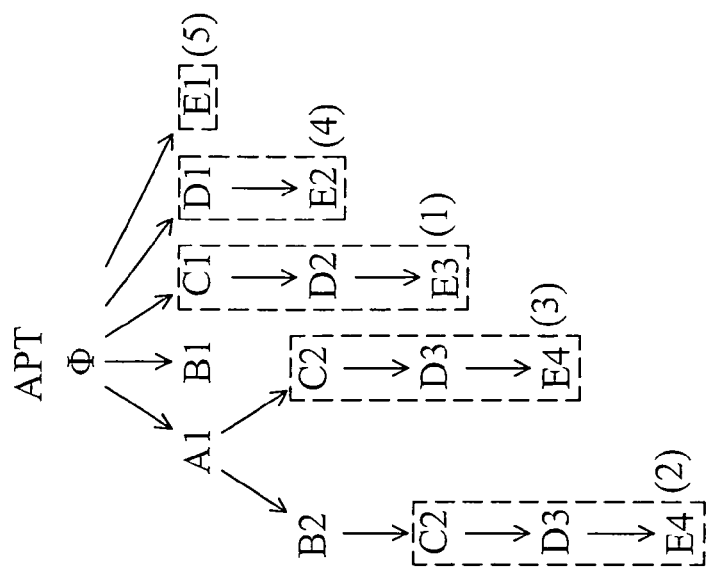
FIG. 11c
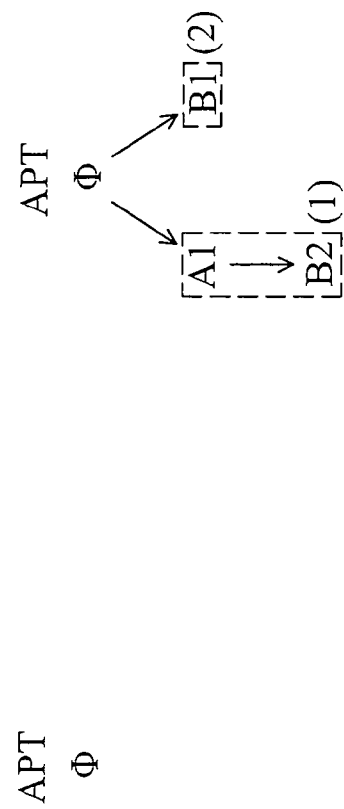
FIG. 11b
APT
Φ
FIG. 11a

SYSTEMS AND METHODS FOR DISCOVERING FREQUENTLY ACCESSED SUBTREES

BACKGROUND

The invention relates to information retrieval, and more particularly, to systems and methods for discovering frequent trees.

In various application domains, requirements for discovering frequently accessed subtrees from access data streams are increasing. Portals and online shopping websites are browsed by thousands of people every hour or even every few minutes. The data stream accessed in the form of trees, representing traversal coverage, is generated to record the browsing behavior of a user. Continuously discovering frequently accessed subtrees over accessed data streams facilitates decision making for website management. For example, the nodes of a frequent subtree indicate frequently accessed pages, which can be pre-fetched to reduce future page access time. In addition, frequently accessed subtrees indicate user interests about the website and can therefore be applied to sales promotions for online shopping. Furthermore, discovering frequently accessed subtrees also benefits man-machine interface (MMI) management for a mobile electronic device, such as a mobile phone, smart phone, MP3 player and similar. In an MMI, the nodes of a frequent subtree indicate the frequently accessed items and therefore the organization of items can be automatically adjusted in response to the discovered frequently accessed subtrees.

SUMMARY

Methods for discovering frequently accessed subtrees, performed by an electronic apparatus, are provided. An embodiment of a method for discovering frequently accessed subtrees comprises the following steps. A request is received from a source. A global prefix tree (GPT) comprising multiple traversal paths is acquired, each traversal path represents one of a plurality of frequently accessed subtrees. A response comprising the GPT is transmitted to the source, thereby enabling the source to discover frequently accessed subtrees based on the GPT. The GPT is generated in response to multiple data streams respectively comprising multiple nodes of a theoretical tree had been traversed.

An embodiment of a method for discovering frequently accessed subtrees comprises the following steps. Multiple data streams respectively comprising accessed nodes of a partially traversed theoretical tree are acquired. An augmented prefix tree (APT) is generated according to each of the acquired data streams. The generated APTs are merged into a global prefix tree (GPT). The GPT comprises multiple first traversal paths and multiple second traversal paths, each of the first traversal paths represents a frequent subtree, and each of the second traversal paths represents a non-frequent subtree. The second traversal paths are periodically removed from the GPT.

Systems for discovering frequently accessed subtrees are provided. An embodiment of a system for discovering frequently accessed subtrees comprises a storage module, a subtree generation module and a subtree maintenance module. The storage module stores multiple data streams respectively comprising accessed nodes of a partially traversed theoretical tree. The subtree generation module acquires the data streams from the storage module, generates an augmented prefix tree (APT) according to each of the acquired data streams, merges the generated APTs into a global prefix tree (GPT) and stores the GPT in the storage module. The GPT comprises multiple first traversal paths and multiple second traversal paths, each of the first traversal paths represents a frequent subtree, and each of the second traversal paths represents a non-frequent subtree. The subtree maintenance module periodically removes the second traversal paths from the GPT and stores the resulting GPT in the storage module.

BRIEF DESCRIPTION OF DRAWINGS

The invention will become more fully understood by referring to the following detailed description with reference to the accompanying drawings, wherein:

FIGS. 11a to 11c are diagrams of APTs in various aspects during APT generation;

DETAILED DESCRIPTION

Figure 1:
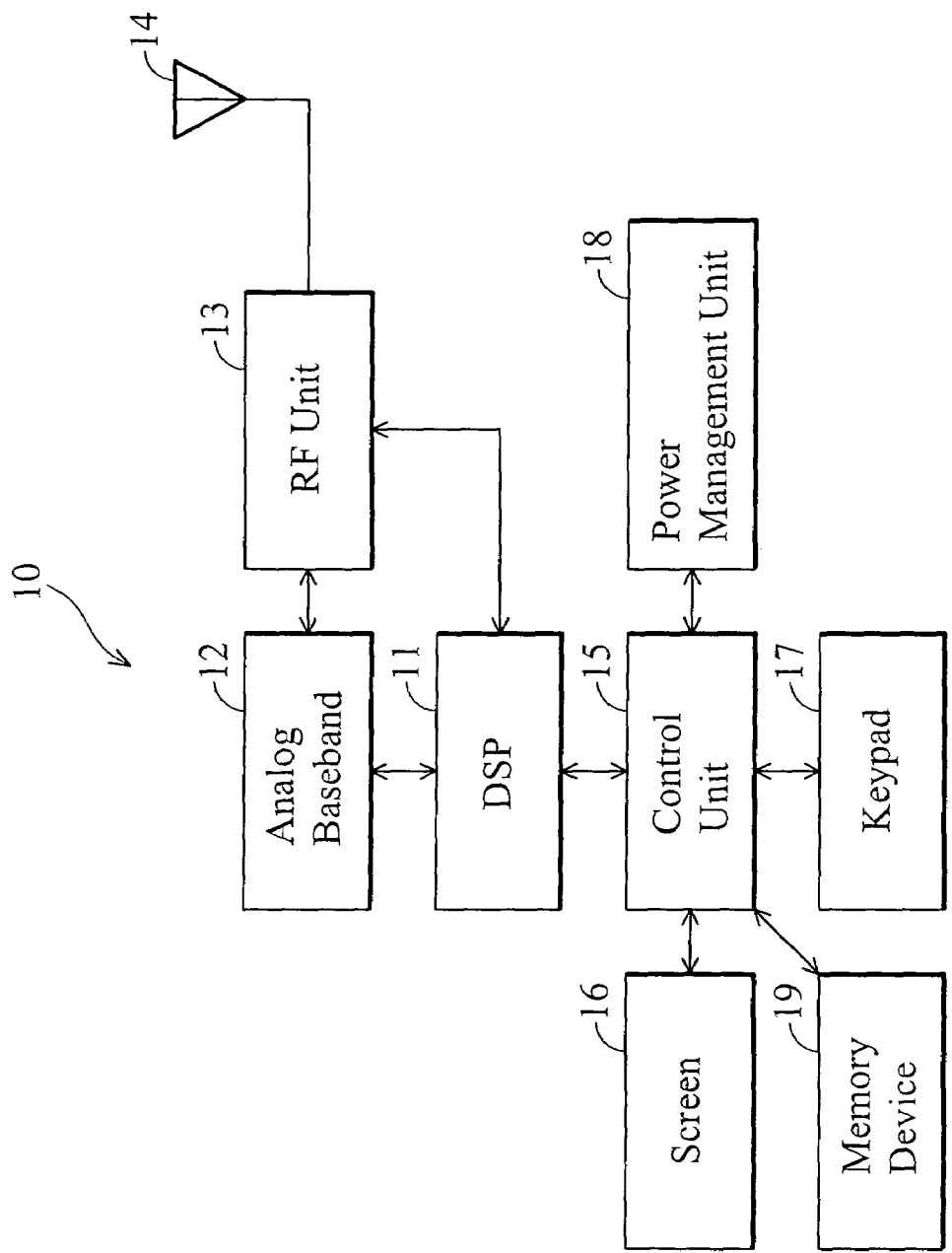
FIG. 1 is a diagram of a hardware environment applicable to an embodiment of a mobile device.

FIG. 1 is a diagram of a hardware environment applicable to an embodiment of a mobile device 10 comprising a DSP (digital signal processor) 11, an analog baseband 12, a RF (Radio Frequency) unit 13, an antenna 14, a control unit 15, a screen 16, a keypad 17, a power management unit 18 and a memory device 19. Moreover, those skilled in the art will understand that some embodiments may be practiced with other embedded system devices, including PDAs (digital personal assistants), digital music players, portable disk drives, programmable consumer electronics, and the like. The control unit 15 may be a micro-processor (MPU) unit loading and executing program modules from the memory device 19. The programs, when executed, performs methods for discovering frequently accessed subtrees. The memory device 19 is preferably a random access memory (RAM), but may also include read-only memory (ROM) or flash memory, storing program modules and data.

Figure 2:
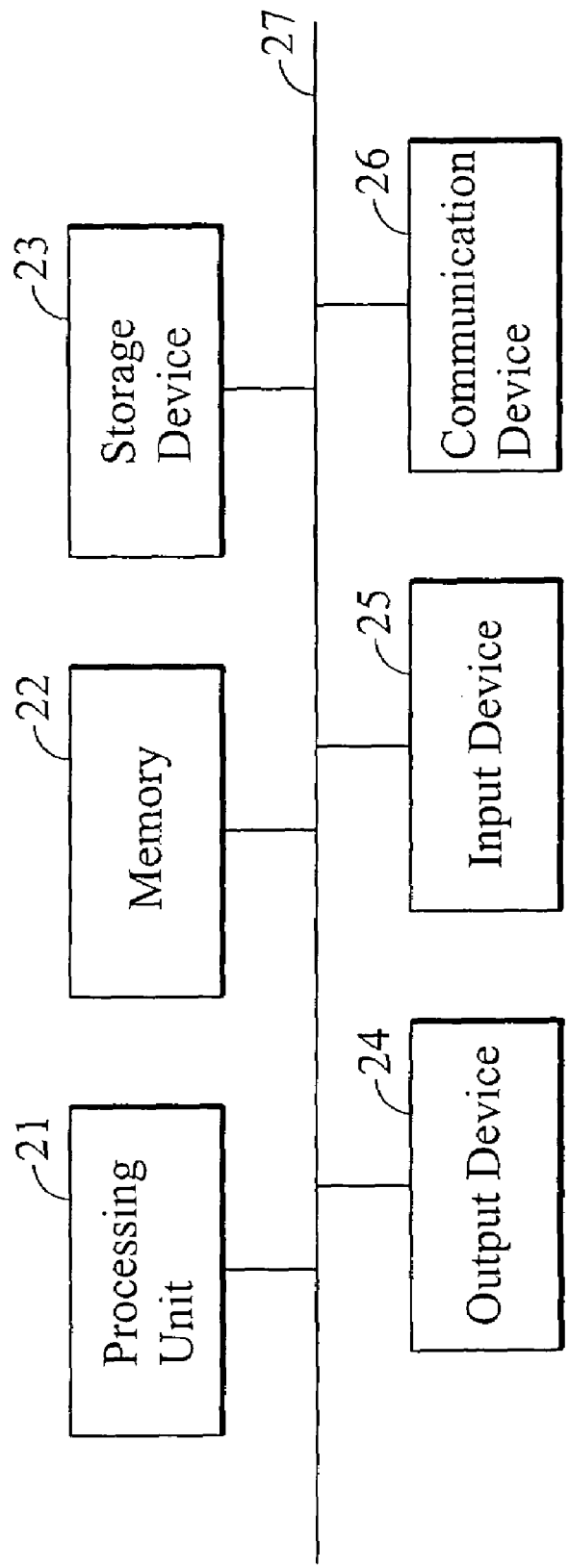
FIG. 2 is a diagram of a hardware environment applicable to an embodiment of a personal computer.

FIG. 2 is a diagram of a hardware environment applicable to an embodiment of the personal computer 20, comprising a processing unit 21, memory 22, a storage device 23, an output device 24, an input device 25 and a communication device 26. The processing unit 21 is connected by buses 27 to the memory 22, storage device 23, output device 24, input device 25 and communication device 26 based on Von Neumann architecture. There may be one or more processing units 21, such that the processor of the computer comprises a single central processing unit (CPU), a microprocessing unit (MPU) or multiple processing units, commonly referred to as a parallel processing environment. The memory 22 is preferably a random access memory (RAM), but may also include read-only memory (ROM) or flash memory. The memory 22 preferably stores program modules executed by the processing unit 21 to perform methods for discovering frequently accessed subtrees. Generally, program modules include routines, programs, objects, components, or others, that perform particular tasks or implement particular abstract data types. Moreover, those skilled in the art will understand that some embodiments may be practiced with other computer system configurations, including multiprocessor-based, microprocessor-based computers, network PCs, minicomputers, mainframe computers, and the like. Some embodiments may also be practiced in distributed computing environments where tasks are performed by remote processing devices linked through a communication network. In a distributed computing environment, program modules may be located in both local and remote memory storage devices based on various remote access architectures such as DCOM, CORBA, Web objects, Web Services or similar. The storage device 23 may be a hard drive, magnetic drive, optical drive, portable drive, or nonvolatile memory drive. The drives and associated computer-readable media thereof (if required) provide nonvolatile storage of computer-readable instructions, data structures and program modules. The communication device 26 may be a wired network adapter or a wireless network adapter compatible with GPRS, 802.x, Bluetooth and the like.

Figure 3:
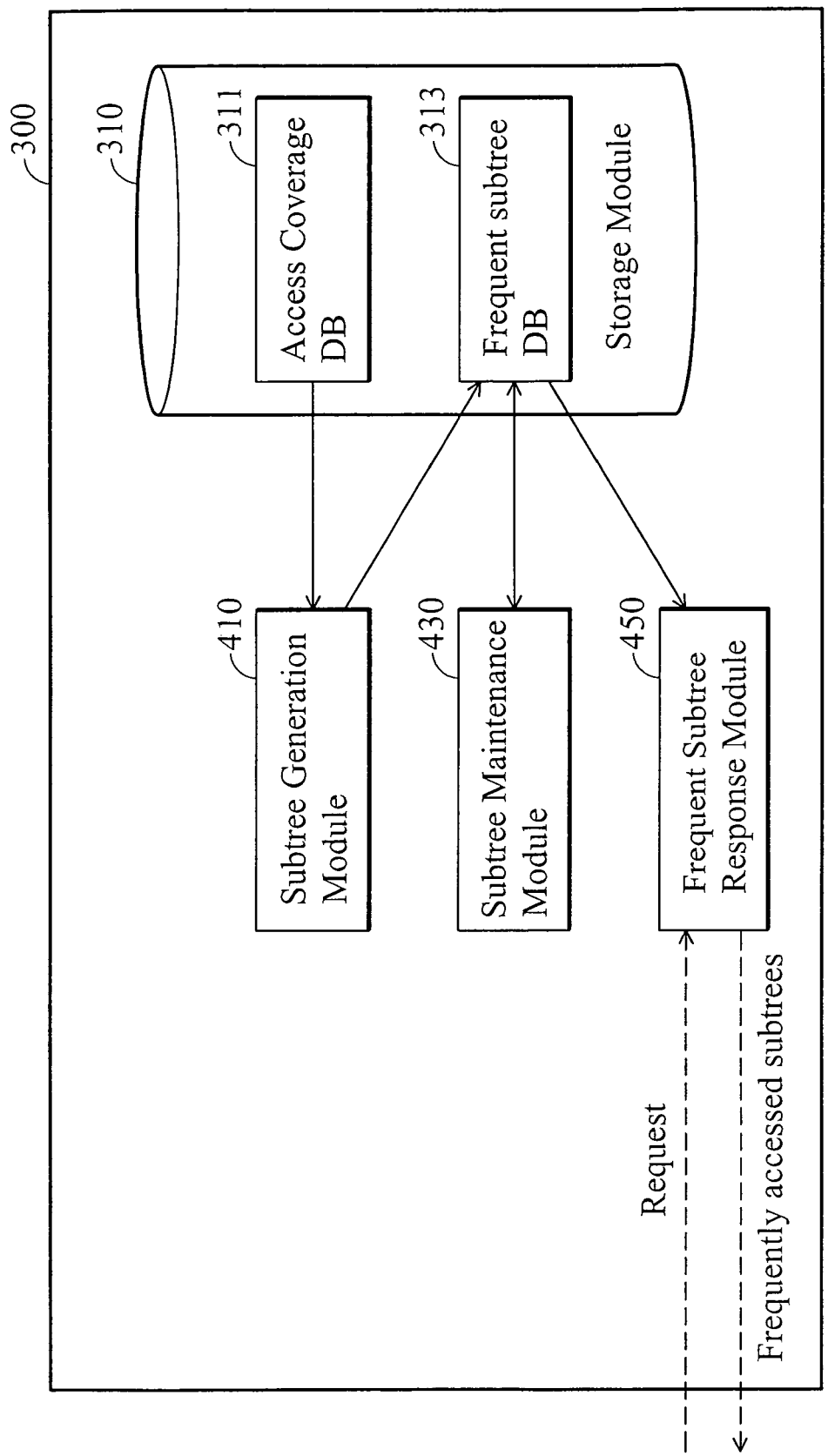
FIG. 3 is a diagram of an embodiment of a system for discovering frequently accessed subtrees.

FIG. 3 is a diagram of an embodiment of a system for discovering frequently accessed subtrees, comprising a storage module 310, a subtree generation module 410, a subtree maintenance module 430 and a frequent subtree response module 450. The storage module 310 stores an access coverage database (DB) 311 and a frequent subtree DB 313. The storage module 310 can be implemented in a storage device (e.g. 19 of FIG. 1, 22 or 23 of FIG. 2, or other). The subtree generation module 410, subtree maintenance module 430 and frequent subtree response module 450 may be implemented in program modules.

Figure 4:
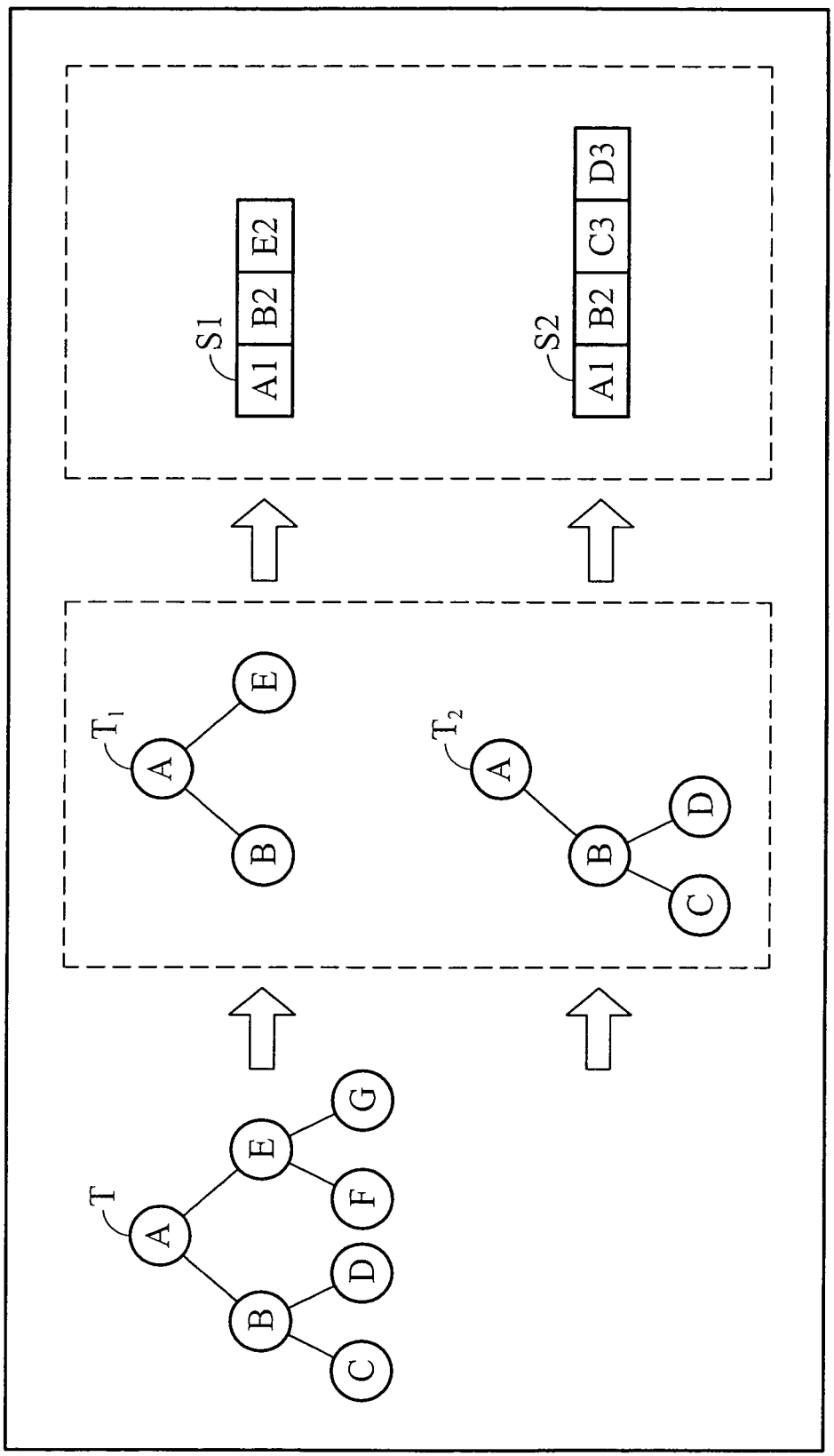
FIG. 4 is a diagram of exemplary access trees.

The access coverage DB 311 contains information of multiple access subtrees. Each access subtree represents accessed nodes of a partially traversed theoretical tree by a user, each node may represent a Web page, a hyperlink on a Web page, a menu item on a MMI or other. FIG. 4 is a diagram of exemplary access trees. An embodiment of an MMI containing several menu items A to G organized in a tree T (also called the theoretical tree). For example, a node A has two child nodes (i.e. descendent nodes) B and E. Conversely, nodes B and E respectively have a parent node A. Child nodes B and E having the same parent node A are sibling nodes. When clicking menu items A, B and E by a user, an access subtree $T_1$ is recorded in the access coverage DB 311. When a user clicks menu items A, B, C and D, an access subtree $T_2$ is recorded in the access coverage DB 311. The access subtrees $T_1$ and $T_2$ may be respectively represented as data streams S1 "A1 B2 E2" and S2 "A1 B2 C3 D3", where the alphabets indicate representation of nodes, and the numbers represent depths of nodes. Nodes of an access tree are sequentially arranged in a data stream by a well-known depth-first traversal. Moreover, those skilled in the art will understand that some embodiments may be practiced with other access subtree data structures, such as an adjacency matrix, an adjacency list or other.

Figure 5:
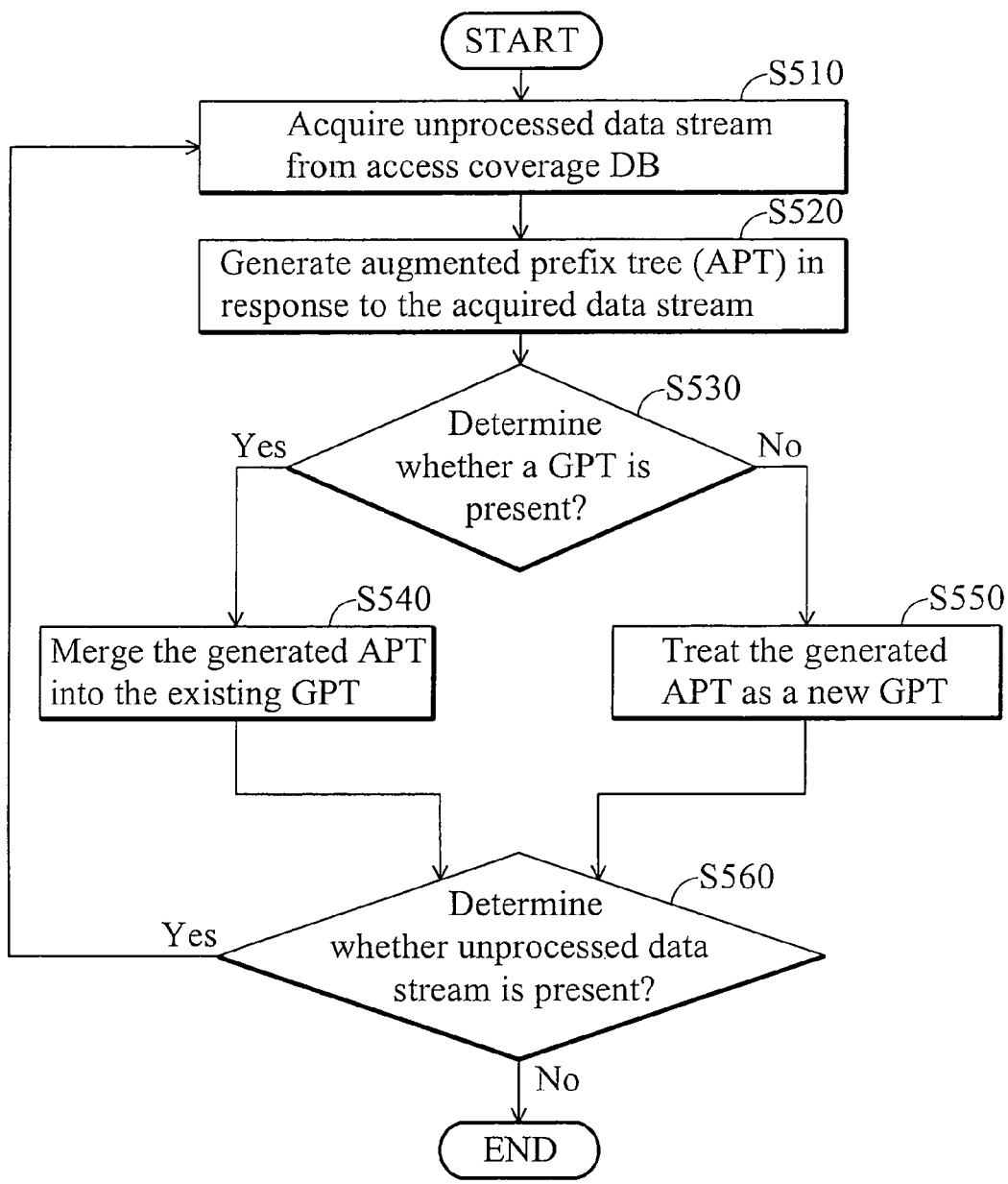
FIG. 5 is a flowchart illustrating an embodiment of a method for generating a global prefix tree (GPT)

The subtree generation module 410 acquires data streams from the access coverage DB 311 and generates a global prefix tree (GPT) aggregating possible access subtrees and recording a traversal frequency for each access subtree. FIG. 5 is a flowchart illustrating an embodiment of a method for generating a GPT, performed by the subtree generation module 410. In step S510, an unprocessed data stream is acquired from the access coverage DB 311. In step S520, an augmented prefix tree (APT) is generated in response to the acquired data stream. Details of generation of APT are described in the following. In step S530, it is determined whether a GPT is present. If so, the process proceeds to step S540, and otherwise, to step S550. In step S540, the generated APT is merged into the existing GPT. Details for merging APT into GPT are described in the following. The merged GPT is stored in the frequent subtree DB 313 (FIG. 3). In step S550, the generated APT is treated as a new GPT. It is to be understood that each node of the new GPT further contains a frequency attribute initially recording one and a pruning attribute initially recording zero. The details of the frequency and pruning attributes are described in the following, and are only briefly described herein. The new GPT is stored in the frequent subtree DB 313 (FIG. 3). In step S560, it is determined whether an unprocessed data stream is present. If so, the process proceeds to step S510, and otherwise, the process ends.

Figure 6:
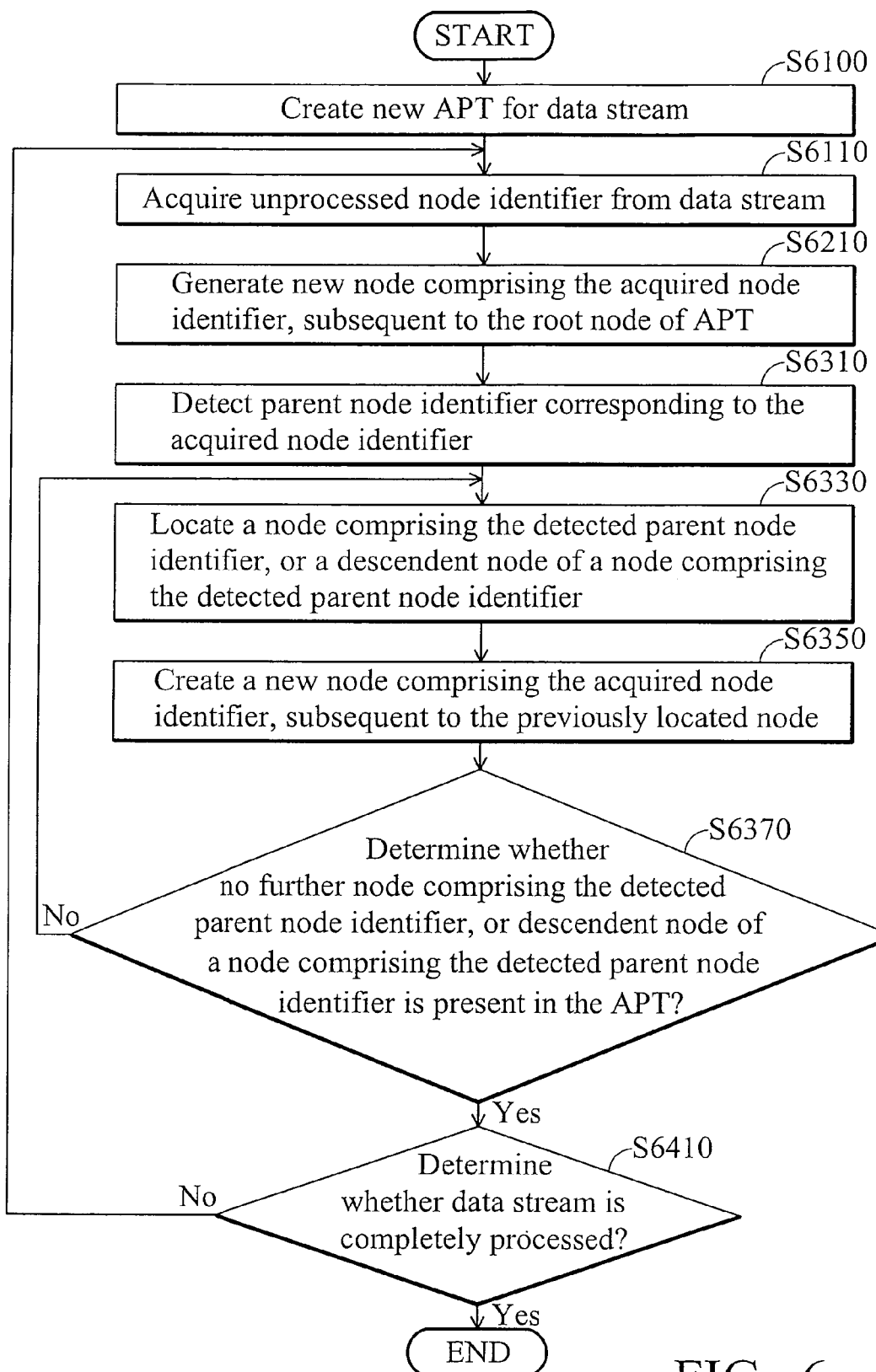
FIG. 6 is a flowchart illustrating an embodiment of a method for generating an augmented prefix tree (APT) corresponding to a data stream.

FIG. 6 is a flowchart illustrating an embodiment of a method for generating an APT corresponding to a data stream, executed by step S520. In step S6100, a new APT is created for a data stream, only comprising a root node. In step S6110, unprocessed node identifier is acquired from a data stream. In step S6210, a new node comprising the acquired node identifier is generated, subsequent to the root node of the APT. In step S6310, a parent node identifier corresponding to the acquired node identifier is detected. The parent node identifier identifies a node being a parent node of a node identified by the acquired node identifier. The parent node identifier may be detected from the previously processed node identifiers. For example, referring to FIG. 4, when acquiring a node identifier, such as "E2", from a data stream S1, the parent node identifier is the most recently processed node identifier with a depth, such as "A1", lower by one level than that with the acquired node identifier. A loop containing steps S6330 to S6370 is then repeatedly executed to locate nodes comprising the detected parent node identifier, and descendent nodes thereof in the APT, and creates new nodes comprising the acquired node identifier, respectively subsequent to the located nodes. Specifically, in step S6330, a node comprising the detected parent node identifier, or a descendent node of a node comprising the detected parent node identifier is located, preferably in depth-first traversal. In step S6350, a new node comprising the acquired node identifier is created, subsequent to the previously located node. In step S6370, it is determined whether no further node comprising the detected parent node identifier, or descendent node of a node comprising the detected parent node identifier is present in the APT. If so, the process proceeds to step S6330 to locate the next node comprising the detected parent node identifier, and otherwise, to step S6410 to end the loop. In step S6410, it is determined whether the data stream is completely processed. If so, the process ends, and otherwise, the process proceeds to step S6110 to process the next unprocessed node identifier therein.

Figure 7:
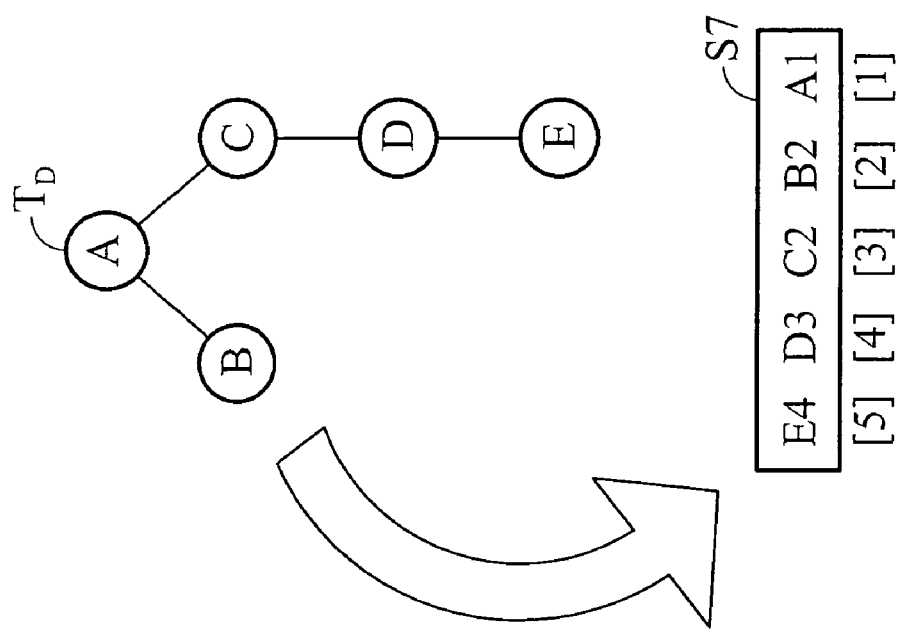
FIG. 7 is a diagram of an exemplary subtree and a corresponding data stream.
Figure 8A:
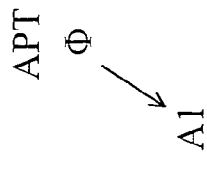
FIGS. 8a to 8f are diagrams of APTs in various aspects during APT generation.
Figure 8B:
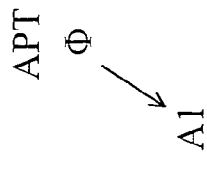
Figure 8C:
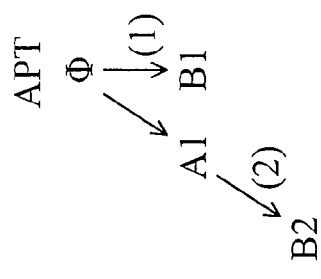
Figure 8D:
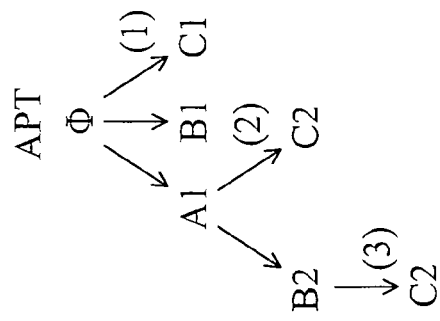
Figure 8F:
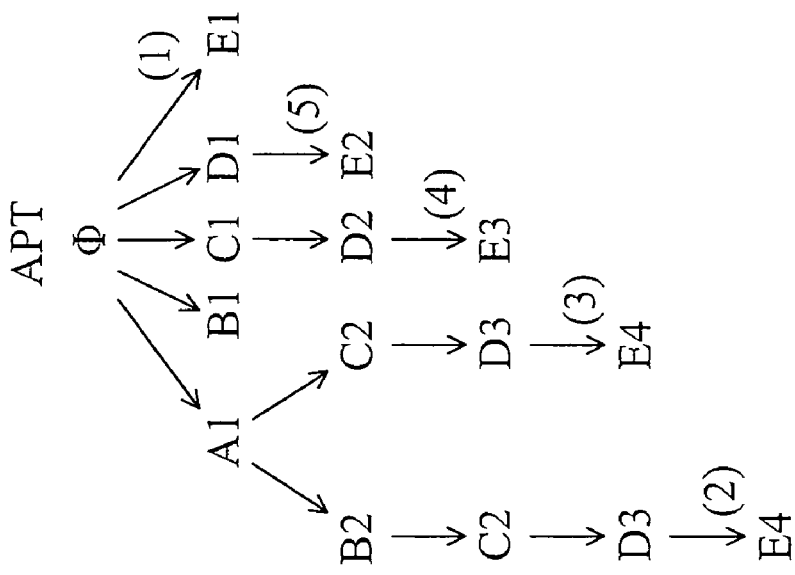
Figure 8E:
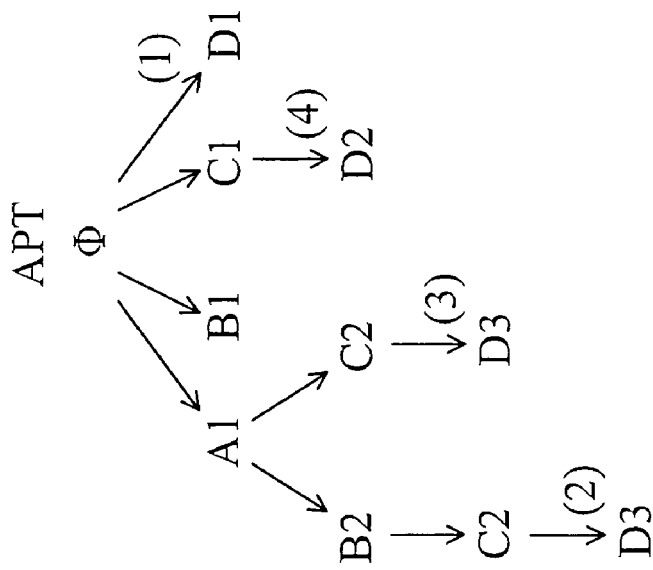
Figure 9:
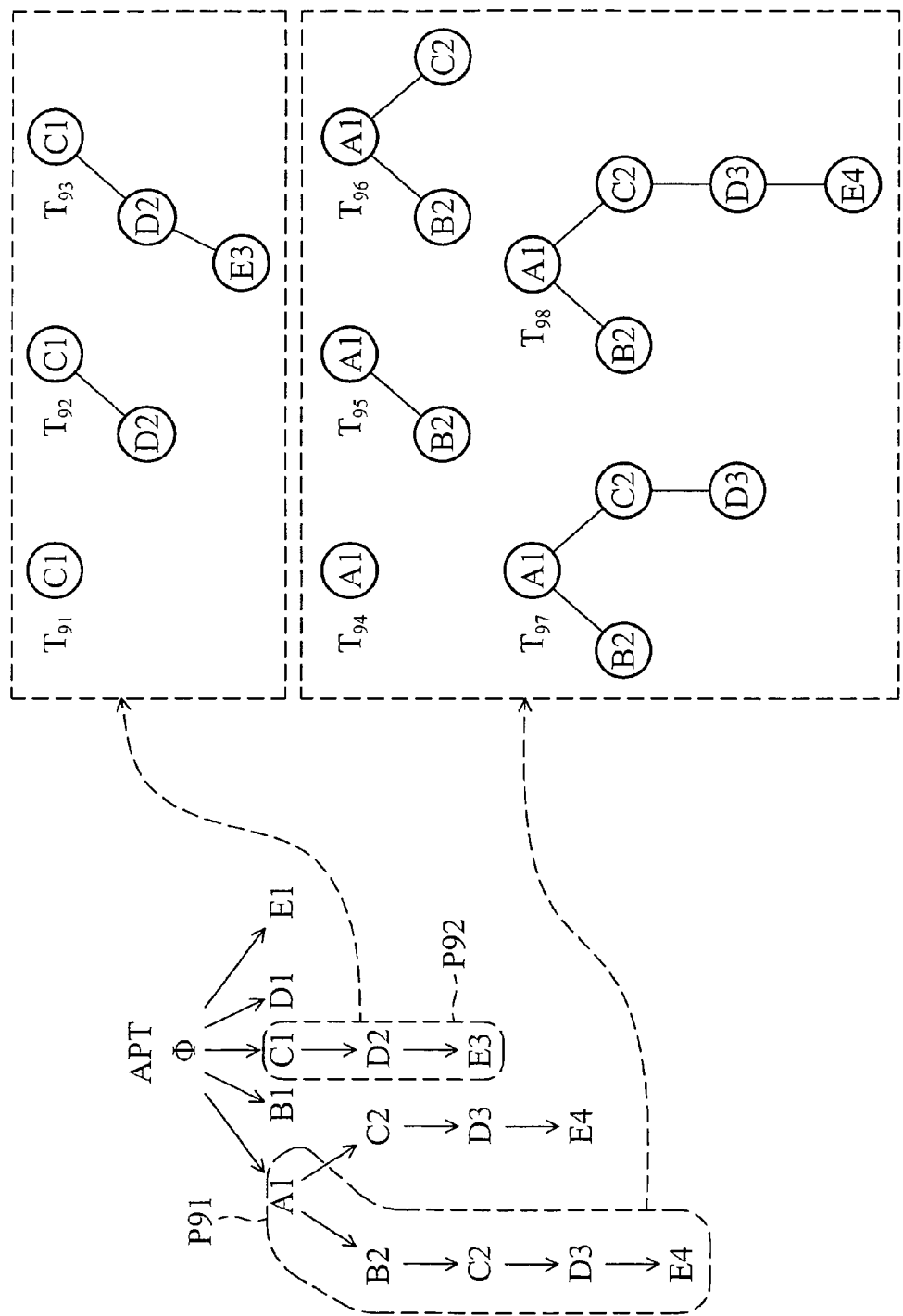
FIG. 9 is a diagram of exemplary mappings between the APT and subtrees.

Detailed descriptions of examples for generating an APT is provided in the following. FIG. 7 is a diagram of an exemplary subtree $T_D$ and a corresponding data stream S7. FIGS. 8a to 8f are diagrams of APTs in various aspects during APT generation. In the beginning of APT generation for the data stream S7, a new APT is created (step S6100 of FIG. 6), the new APT as shown in FIG. 8a. When acquiring a node identifier "A1", a new node comprising "A1" is created and inserted into the APT (S6210 of FIG. 6), subsequent to a root node "Φ", the newly generated APT as shown in FIG. 8b. Referring to FIG. 8c, when acquiring a node identifier "B2", a new node comprising "B1" is created and inserted into the APT (S6210 of FIG. 6), subsequent to the root node, and then, a parent node identifier "A1" corresponding to the acquired node identifier "B2" is detected (S6310 of FIG. 6). A node comprising the detected parent node identifier, such as "A1", in the APT is located (S6330 of FIG. 6), and a new node comprising the acquired node identifier "B2" is created, subsequent to the located node (S6350 of FIG. 6). Referring to FIG. 8d, when acquiring a node identifier "C2", a new node comprising "C1" is created and inserted into the APT (S6210 of FIG. 6), subsequent to the root node, and then, a parent node identifier "A1" corresponding to the acquired node identifier "C2" is detected (S6310 of FIG. 6). A node comprising the detected parent node identifier, such as "A1", and a descendent node thereof, such as "B2", in the APT are respectively located (S6330 of FIG. 6), and new nodes comprising the acquired node identifier "B2" are respectively created, subsequent to the located nodes (S6350 of FIG. 6). Referring to FIG. 8e, when acquiring a node identifier "D3", a new node comprising "D1" is created and inserted into the APT (S6210 of FIG. 6), subsequent to the root node, and then, a parent node identifier "C2" corresponding to the acquired node identifier "D3" is detected (S6310 of FIG. 6). Nodes comprising the detected parent node identifier, such as "C2" and "C1", in the APT are respectively located (S6330 of FIG. 6), and new nodes comprising the acquired node identifier "D3" or "D2" are respectively created, subsequent to the located nodes (S6350 of FIG. 6). Referring to FIG. 8f, when acquiring a node identifier "E4", a new node comprising "E1" is created and inserted into the APT (S6210 of FIG. 6), subsequent to the root node, and then, a parent node identifier "D3" corresponding to the acquired node identifier "E4" is detected (S6310 of FIG. 6). Nodes comprising the detected parent node identifier, such as "D3", "D2" and "D1", in the APT are respectively located (S6330 of FIG. 6), and new nodes comprising the node identifier "E4", "E3" or "E2" are respectively created, subsequent to the located nodes (S6350 of FIG. 6). It is to be understood that each traversal path in the resulting APT represents a subtree while the entire APT aggregates all possible subtrees extracted from the data stream. FIG. 9 is a diagram of exemplary mappings between the APT and subtrees. When traversing a path P91 in the resulting APT, subtrees $T_{94}$ to $T_{98}$ are sequentially discovered. Furthermore, when traversing a path P92, subtrees $T_{91}$ to $T_{93}$ are sequentially discovered.

Figure 10A:
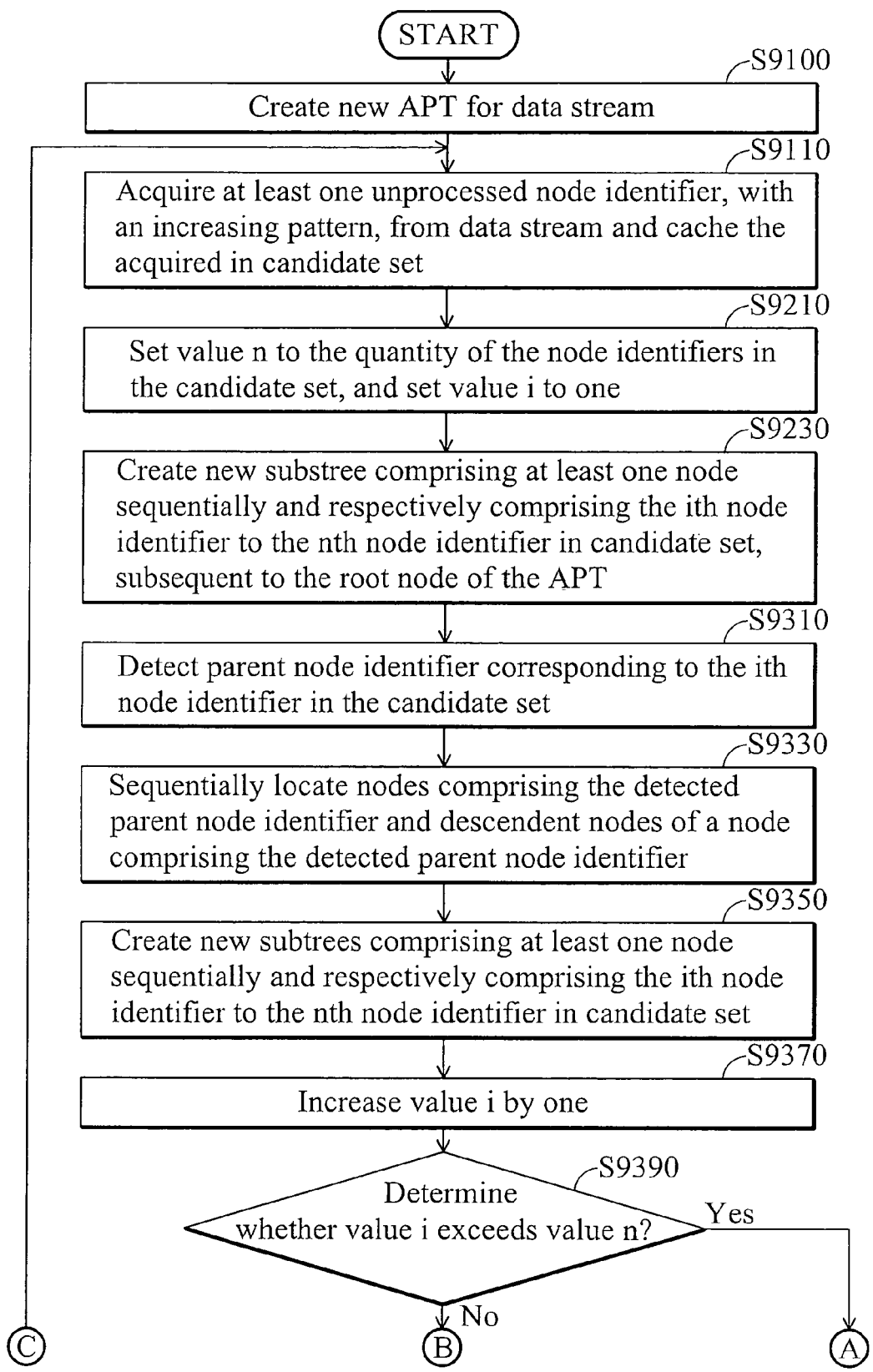
FIGS. 10a and 10b are flowcharts illustrating an embodiment of a method for generating an APT corresponding to a data stream.
Figure 10B:
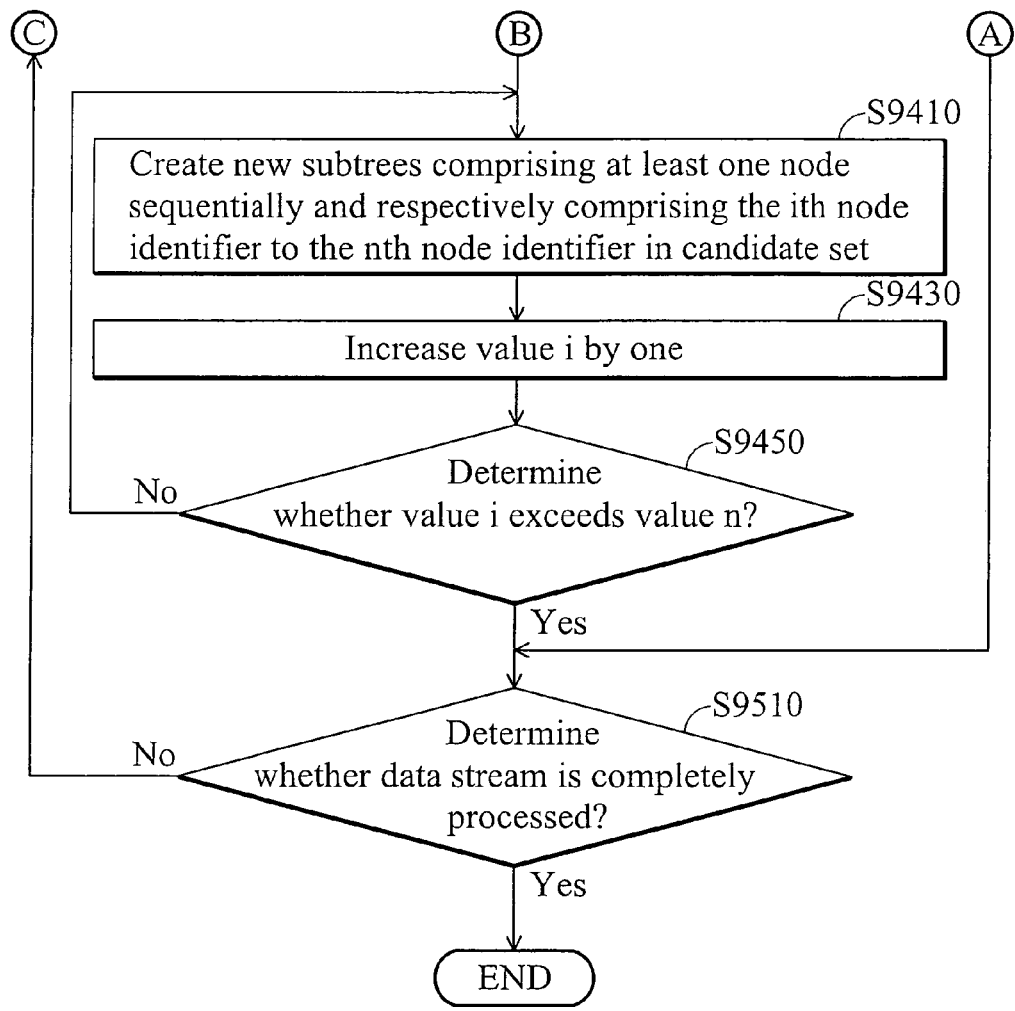

FIGS. 10a and 10b are flowcharts illustrating an embodiment of a method for generating an APT corresponding to a data stream, executed by step S520. In step S9100, a new APT is created for a data stream, only comprising a root node. In step S9110, at least one unprocessed node identifier with an increasing pattern is acquired from a data stream and cached in a candidate set. The increasing pattern defines that a depth of the following of any two adjacent node identifiers equals a depth of the prior adjacent node identifier plus one. For example, referring to FIG. 7, a portion of data stream, such as "A1 B2" or "C2 D3 E4", has the increasing pattern. In step S9210, a value n is set to the quantity of the node identifiers in the candidate set, and a value i is set to one. In step S9230, a new subtree comprising at least one node sequentially and respectively comprising the ith node identifier to the nth node identifier in the candidate set, subsequent to the root node of the APT. In step S9310, a parent node identifier corresponding to the ith node identifier in the candidate set is detected. The parent node identifier identifies a node as a parent node of a node identified by the ith node identifier in the candidate set. The parent node identifier may be detected from the previously processed node identifiers. For example, referring to FIG. 4, when acquiring ith node identifier, such as "C2", in a candidate set comprising node identities, such as "C2 D3 E4", the parent node identifier is the most recently processed node identifier with a depth, such as "A1", lower by one level than that with the acquired node identifier. In step S9330, nodes comprising the detected parent node identifier and descendent nodes of a node comprising the detected parent node identifier are sequentially located, preferably in depth-first traversal. In step S9350, new subtrees comprising at least one node sequentially and respectively comprising the ith node identifier to the nth node identifier in the candidate set are created, subsequent to the previously located nodes. In step S9370, the value i is increased by one. In step S9390, it is determined whether the value i exceeds value n. If so, the process proceeds to step S9510, and otherwise, to step S9410. In step S9410, new subtrees comprising at least one node sequentially and respectively comprising the ith node identifier to the nth node identifier in the candidate set are created, subsequent to the root nodes. In step S9450, the value i is increased by one. In step S9450, it is determined whether the value i exceeds the value n. If so, the process proceeds to step S9510, and otherwise, to step S9410. In step S9510, it is determined whether the data stream is completely processed. If so, the process ends, and otherwise, the process proceeds to step S9110 to process the next unprocessed node identifier therein.

Detailed descriptions of examples for generating an APT is provided in the following. Referring to FIG. 7, an exemplary subtree $T_D$ and a corresponding data stream S7 are provided. FIGS. 11a to 11c are diagrams of APTs in various aspects during APT generation. In the beginning of APT generation for the data stream S7, a new APT is created (step S9100 of FIG. 10), the new APT is shown in FIG. 10a. When acquiring unprocessed node identifiers with the increasing pattern "A1 B2" and caching them in a candidate set, a new subtree comprising two nodes sequentially and respectively comprising node identifiers "A1" and "B2" in the candidate set are created, subsequent to a root node "Φ" (steps S9210 to S9230 of FIG. 10a). Steps S9310 to S9350 are ignored because no parent node identifier corresponding to the node identifier "A1" is detected. A new subtree comprising one node comprising node identifier "B2" is then created subsequent to the root node of APT (steps S9370 to S9430 of FIGS. 10a and 10b). The generated result is shown in FIG. 11b. When acquiring unprocessed node identifiers with the increasing pattern "C2 D3 E4" and caching them in a candidate set, a new subtree comprising three nodes sequentially and respectively comprising node identifiers "C1", "D2" and "E3" in the candidate set are created, subsequent to the root node "Φ" (steps S9210 to S9230 of FIG. 10a). A parent node identifier "A1" corresponding to the first node identifier "C2" in the candidate set is detected (S9310 of FIG. 10a). A node comprising the detected parent node identifier, such as "A1", and a descendent node thereof, such as "B2", in the APT are respectively located (S9330 of FIG. 10a), and new subtrees comprising three nodes sequentially and respectively comprising node identifiers "C1", "D2" and "E3" in the candidate set are created, subsequent to the located nodes (S9350 of FIG. 10a). And then, a new subtree comprising two nodes sequentially and respectively comprising node identifiers "D1" and "E2" is created subsequent to the root node of APT (steps S9370 to S9410 of FIGS. 10a and 10b). A new subtree comprising one node comprising node identifier "E1" is created subsequent to the root node of APT (steps S9390 to S9430 of FIGS. 10a and 10b). The generated result is shown in FIG. 11c.

Figure 12:
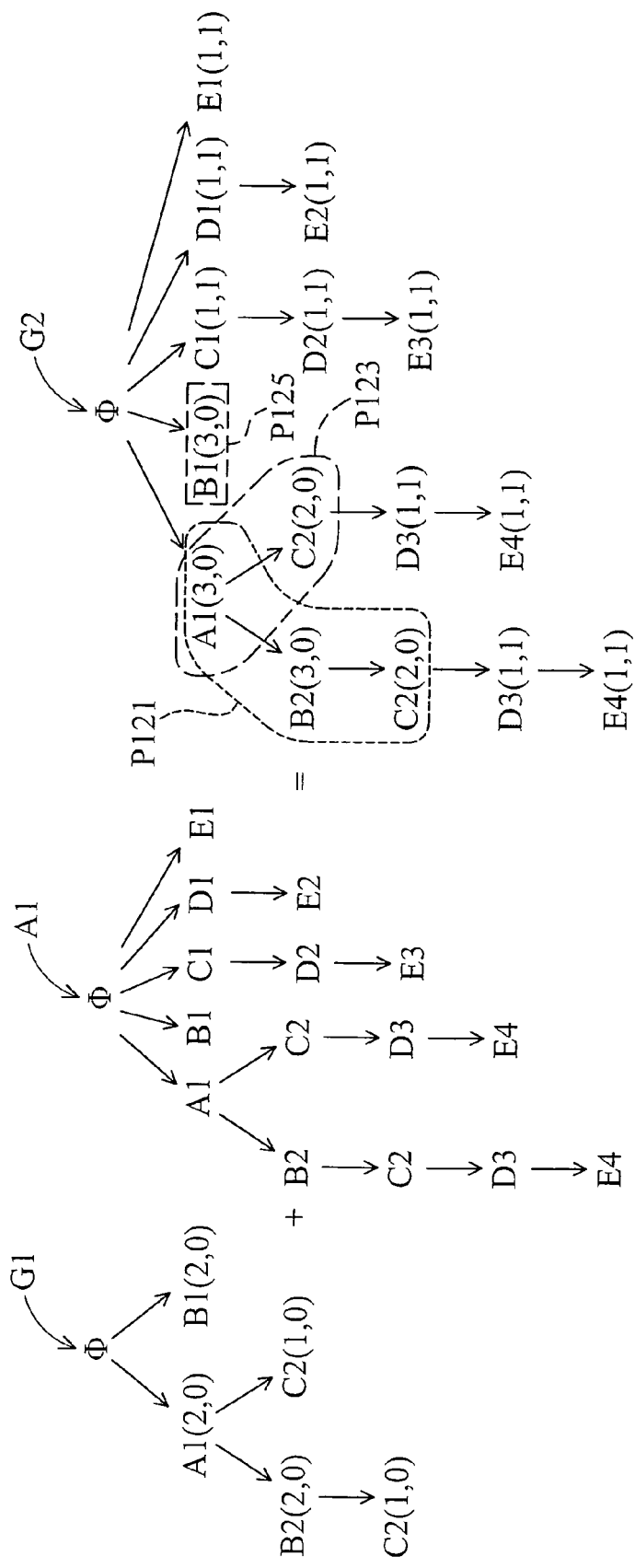
FIG. 12 is a diagram illustrating examples for merging an APT into a GPT to generate a new GPT.

Detailed descriptions of examples of merging an APT into an GPT are provided in the following. FIG. 12 is a diagram illustrating examples for merging an APT into an GPT to generate a new GPT. An GPT G1 and an APT A1 are provided. After merging the APT A1 into the GPT G1, a new GPT G2 is generated, wherein all frequency attributes (as the bracketed former numbers) of nodes in traversal paths P121, P123 and P125 duplicating with that in the APT A1 are respectively increased by one, frequency attributes of newly inserted nodes are respectively set to one. Furthermore, pruning attributes (as the bracketed later numbers) of newly inserted nodes are respectively set to a pruning index indicating how many times a pruning procedure has been performed. The details of the pruning procedure is described in the following, and only briefly described herein.

Figure 13:
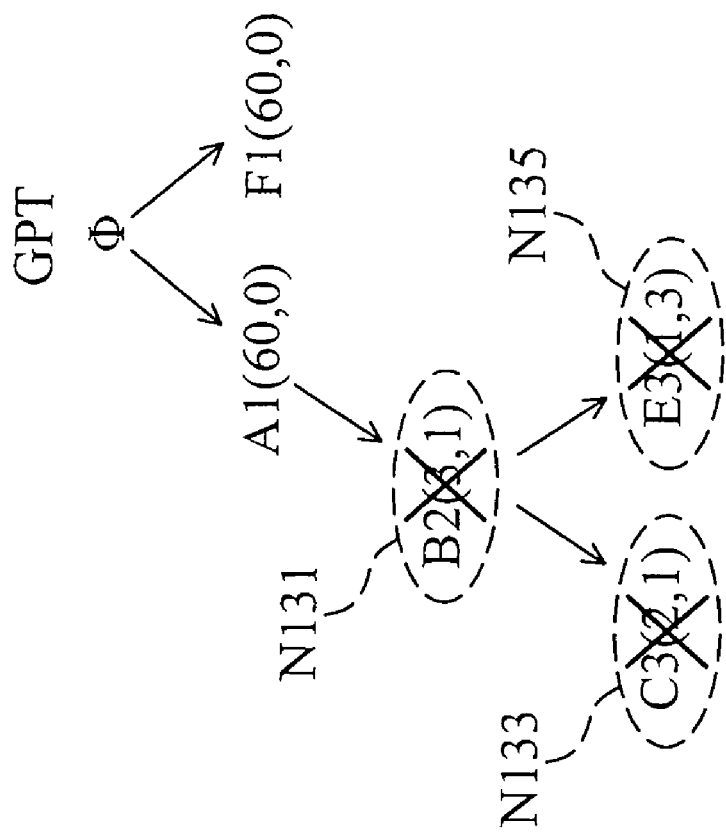
FIG. 13 is a diagram of exemplary pruning.

Referring to FIG. 3, the subtree maintenance module 430 determines a pruning threshold, removes nodes whose frequency attribute values plus pruning attribute values are equal to or lower than the determined pruning threshold from the current GPT (i.e. prunes the current GPT) and stores the pruned GPT in the frequent subtree DB 313 after processing a predetermined quantity of data streams from the last pruning, such as 100, 1000 or other, resulting in removal of non-frequent nodes from the current GPT. It is to be understood that the predetermined quantity is configurable. Furthermore, after the current GPT is pruned, a pruning index, initially being zero, is increased by one. The pruning condition may be represented by the following formula:

$$(V_f+V_p) \leq \epsilon \times N,$$

where $V_f$ represents a value recorded in a frequency attribute of a node, $V_p$ represents a value recorded in a pruning attribute of a node, $\epsilon$ represents a confidence level between 0 and 0.1, preferably being 0.01 and N represents a quantity of processed data streams. FIG. 13 is a diagram of exemplary pruning. For example, when $\epsilon$ is set to 0.01 and the quantity of processed data stream is 500, nodes whose frequency attribute values plus pruning attribute values are equal to or lower than 5 are removed, such as N131 to N133.

Referring to FIG. 3, frequent subtree response module 450 receives a request indicating acquiring frequent subtrees from an application, retrieves the GPT from the frequent subtree DB 313 and transmits a response containing the retrieved GPT to the application, thereby enabling the application to discover frequently accessed subtrees based on the received GPT.

Figure 14:
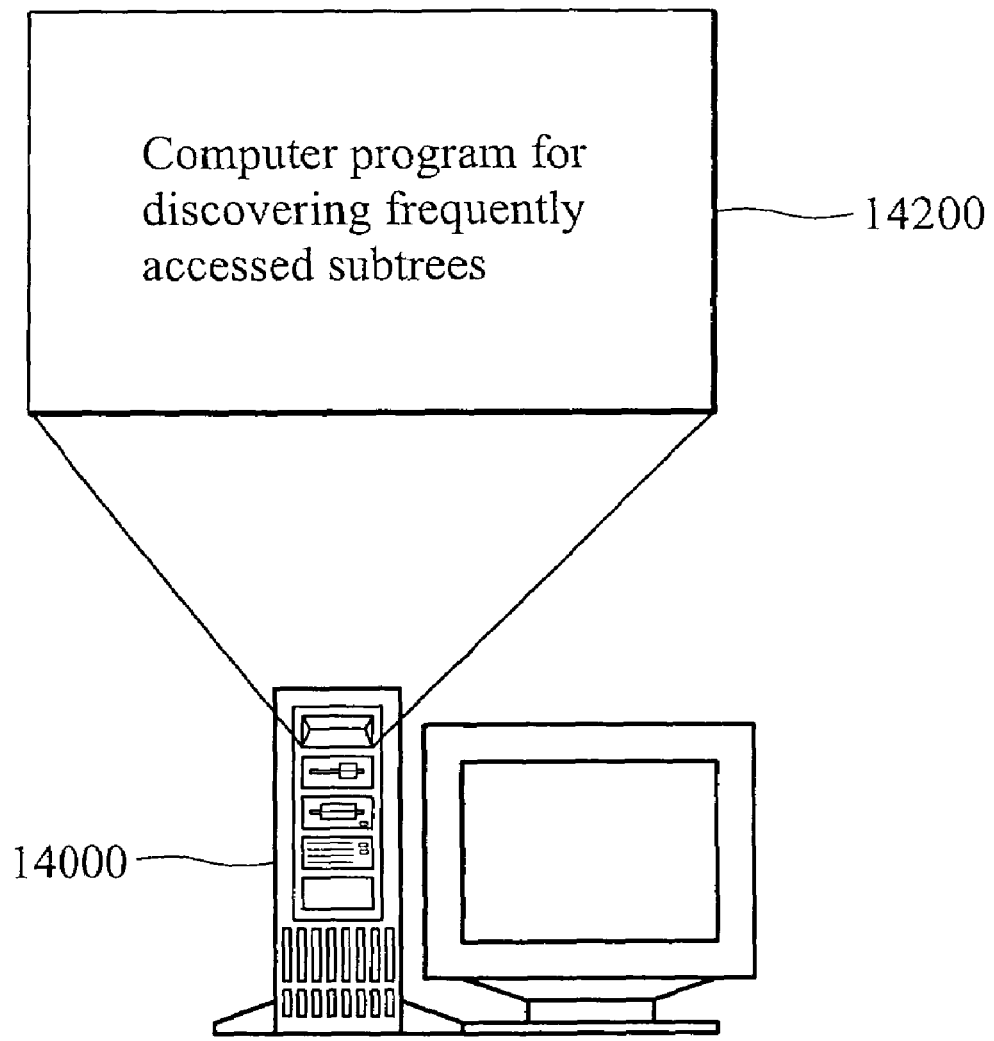
FIG. 14 is a diagram of an embodiment of a storage medium for storing a computer program for discovering frequently accessed subtrees.

Also disclosed is a storage medium as shown in FIG. 14 storing a computer program 14200 providing the disclosed methods for discovering frequently accessed subtrees. The computer program includes a storage medium 14000 having computer readable program code therein for use in a computer system. The computer readable program code, when loaded and executed by the control unit 15 (FIG. 1) or the processing unit 21 (FIG. 2), performs operations executed by the subtree generation module 410, subtree maintenance module 430 and frequent subtree response module 450 (FIG. 3).

Systems and methods, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer system and the like, the machine becomes an apparatus for practicing the invention. The disclosed methods and apparatuses may also be embodied in the form of program code transmitted over some transmission medium, such as electrical wiring or cabling, through fiber optics, or via any other form of transmission, wherein, when the program code is received and loaded into and executed by a machine, such as a computer or an optical storage device, the machine becomes an apparatus for practicing the invention. When implemented on a general-purpose processor, the program code combines with the processor to provide a unique apparatus that operates analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A method for discovering a plurality of frequently accessed subtrees, performed by an electronic apparatus, the electronic apparatus having a storage device and a processing unit for executing steps of the method, the method comprising the steps of:
    acquiring and storing a plurality of data streams in the storage device, the data streams respectively comprising accessed nodes of a partially traversed theoretical tree;
    generating an augmented prefix tree (APT) according to each of the acquired data streams;
    merging the generated APTs into a global prefix tree (GPT) comprising a plurality of first traversal paths and a plurality of second traversal paths, each of the first traversal paths representing a frequent subtree, and each of the second traversal paths representing a non-frequent subtree; and
    periodically removing the second traversal paths from the GPT.

2. The method as claimed in claim 1 wherein each node of the theoretical tree represents a Web page, a hyperlink on a Web page or a menu item on a man-machine interface (MMI).

3. The method as claimed in claim 1 wherein the second traversal paths are removed from the GPT after a predetermined quantity of data streams have been processed from the last removal of the second traversal paths.

4. The method as claimed in claim 1 further comprising:
    receiving a request from a source; and
    transmitting a response comprising the GPT to the source, thereby enabling the source to discover the frequently accessed subtrees based on the GPT.

5. The method as claimed in claim 1 wherein a first end node of each of the first traversal paths records a first value in a first frequency attribute and a second value in a first pruning attribute, the first value plus the second value is larger than a predetermined pruning threshold, a second end node of each of the second traversal paths records a third value in a second frequency attribute and a fourth value in a second pruning attribute, the third value plus the fourth value is not larger than the predetermined pruning threshold, the first or third value represents an occurrence frequency of the corresponding frequent subtree, and the second or fourth value represents a pruning frequency that the GPT had been pruned.

6. The method as claimed in claim 5 wherein the predetermined pruning threshold is calculated by a formula:

$$t=\epsilon \times N,$$

t representing the predetermined pruning threshold, $\epsilon$ representing a confidence level between 0 and 0.1, and N representing a quantity of the data streams.

7. The method as claimed in claim 1 wherein the APT generation step for one data stream further comprises:
creating a new APT for the data stream;
sequentially acquiring an unprocessed node identifier from the data stream;
creating a new node comprising the acquired node identifier, subsequent to a root node of the APT;
detecting a parent node identifier corresponding to the acquired node identifier;
locating a node comprising the detected parent node identifier in the APT, or a descendent node of a node comprising the detected parent node identifier in the APT;
creating a new node comprising the acquired node identifier, subsequent to the previously located node.

8. The method as claimed in claim 1 wherein the APT generation step for one data stream further comprises:
creating a new APT for the data stream;
serially acquiring at least one unprocessed node identifier with an increasing pattern from the data stream;
creating a new subtree comprising at least one node sequentially and respectively comprising the acquired node identifier or identifiers, subsequent to a root node of the APT;
detecting a parent node identifier corresponding to the acquired node identifier or identifiers;
locating a node comprising the detected parent node identifier in the APT, or a descendent node of a node comprising the detected parent node identifier in the APT;
creating a new subtree comprising at least one node sequentially and respectively comprising the acquired node identifier or identifiers, subsequent to the previously located node.

9. A system for discovering frequently accessed subtrees, comprising:
a processing unit;
a storage module storing a plurality of data streams respectively comprising accessed nodes of a partially traversed theoretical tree;
a subtree generation module executed by the processing unit, the subtree generation module acquiring the data streams from the storage module, generating an augmented prefix tree (APT) according to each of the acquired data streams, merging the generated APTs into a global prefix tree (GPT) and storing the GPT in the storage module, the GPT comprising a plurality of first traversal paths and a plurality of second traversal paths, each of the first traversal paths representing a frequent subtree, and each of the second traversal paths representing a non-frequent subtree; and
a subtree maintenance module executed by the processing unit, the subtree maintenance module periodically removing the second traversal paths from the GPT and storing the resulting GPT in the storage module.

10. The system as claimed in claim 9 wherein each node of the theoretical tree represents a Web page, a hyperlink on a Web page or a menu item on a man-machine interface (MMI).

11. The system as claimed in claim 9 wherein the substree maintenance module removes the second traversal paths from the GPT after a predetermined quantity of data streams have been processed from the last removal of the second traversal paths.

12. The system as claimed in claim 9 further comprising a frequent subtree response module receiving a request from a source, acquiring the GPT from the storage module and transmitting a response comprising the acquired GPT to the source, thereby enabling the source to discover the frequently accessed subtrees based on the GPT.

13. The system as claimed in claim 9 wherein a first end node of each of the first traversal paths records a first value in a first frequency attribute and a second value in a first pruning attribute, the first value plus the second value is larger than a predetermined pruning threshold, a second end node of each of the second traversal paths records a third value in a second frequency attribute and a fourth value in a second pruning attribute, the third value plus the fourth value is not larger than the predetermined pruning threshold, the first or third value represents an occurrence frequency of the corresponding frequent subtree, and the second or fourth value represents a pruning frequency that the GPT had been pruned.

14. The system as claimed in claim 13 wherein the predetermined pruning threshold is calculated by a formula:

$$t=\epsilon \times N,$$

t representing the predetermined pruning threshold, $\epsilon$ representing a confidence level between 0 and 0.1, and N representing a quantity of the data streams.

* * * * *